Nov. 23, 1954

H. V. ALLISON ET AL 2,694,886

ABRASIVE CUTTING WHEEL

Filed July 12, 1952

Inventors
HUGH V. ALLISON AND
GEORGE H. KENDALL

By

Attorney

Nov. 23, 1954
H. V. ALLISON ET AL
2,694,886
ABRASIVE CUTTING WHEEL
Filed July 12, 1952
3 Sheets-Sheet 2
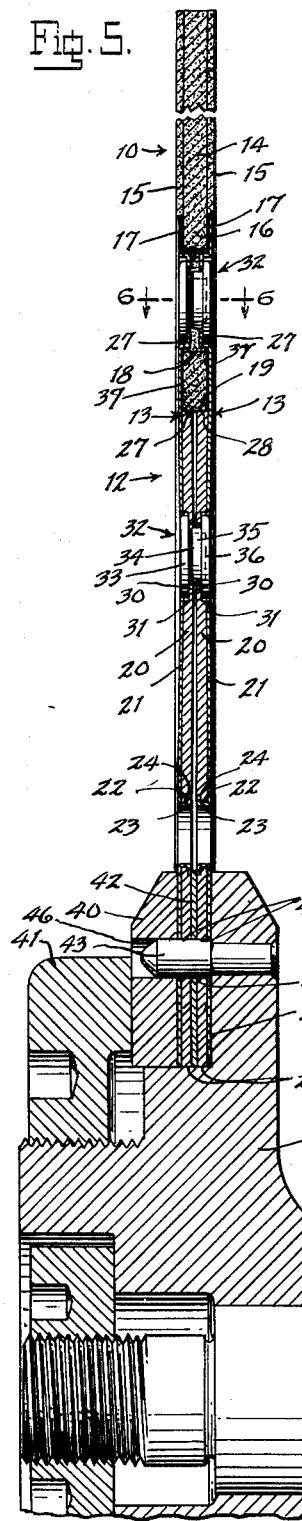
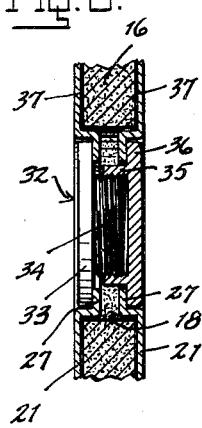
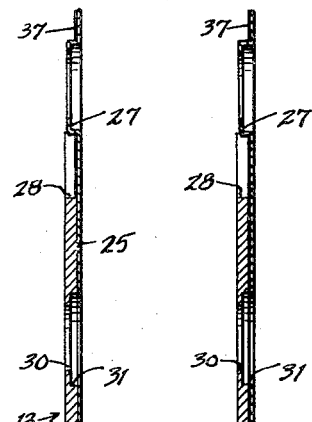
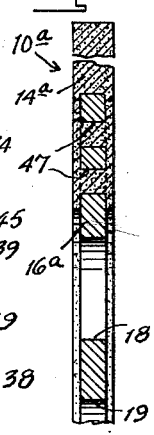
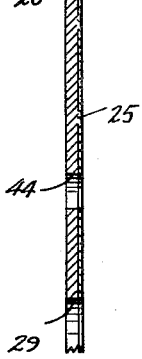
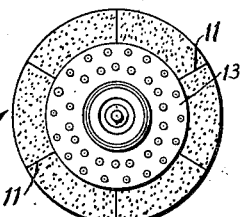
Inventors
HUGH V. ALLISON AND
GEORGE H. KENDALL
Attorney Nov. 23, 1954 — H. V. ALLISON ET AL — 2,694,886
ABRASIVE CUTTING WHEEL
Filed July 12, 1952 — 3 Sheets-Sheet 3
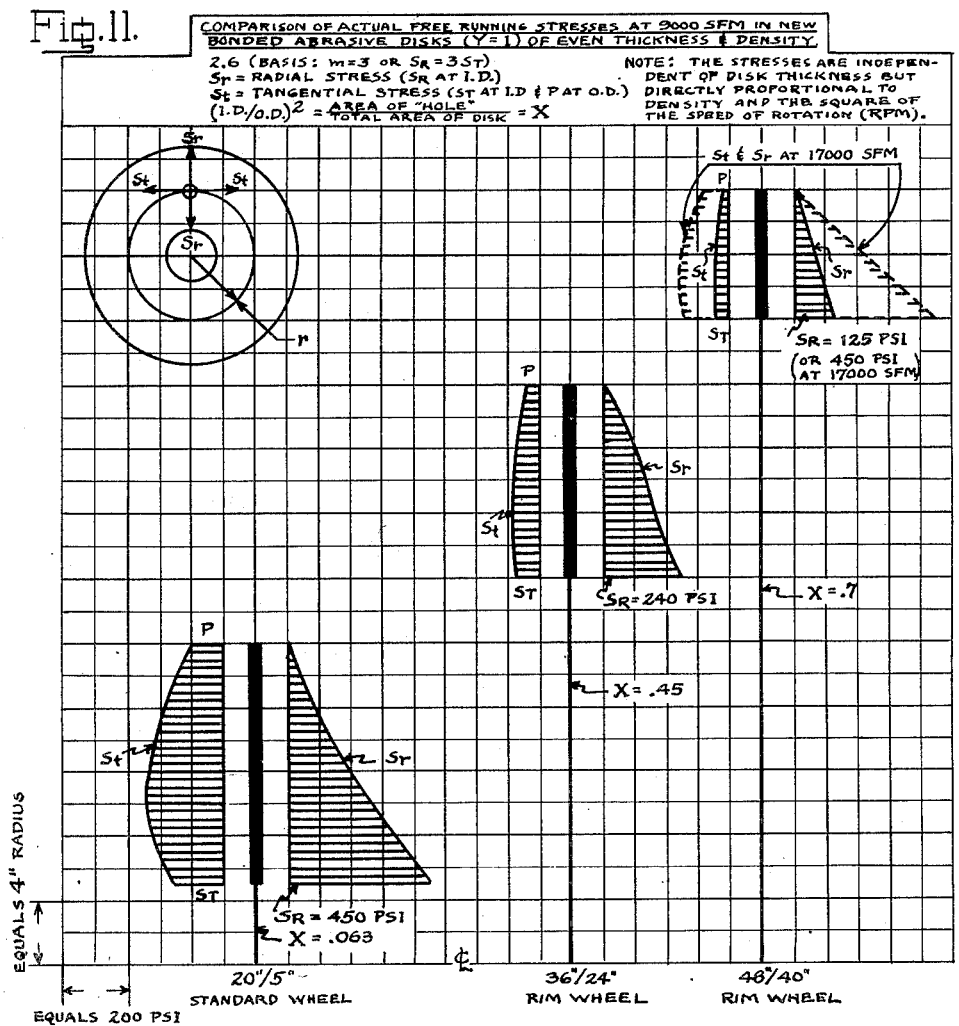
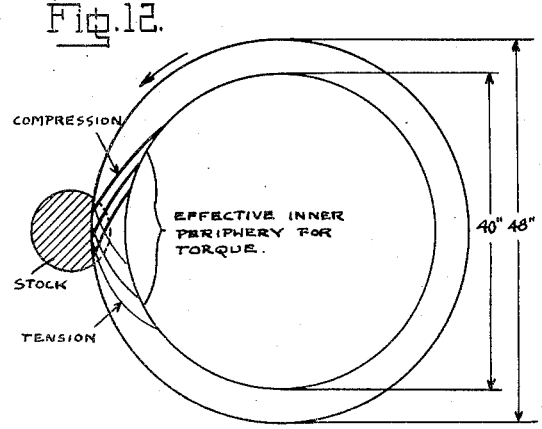
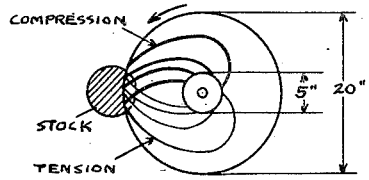
Inventors
HUGH V. ALLISON AND
GEORGE H. KENDALL
Attorney United States Patent Office 2,694,886
Patented Nov. 23, 1954

2,694,886

ABRASIVE CUTTING WHEEL

Hugh V. Allison, Fairfield, and George H. Kendall, Darien, Conn., assignors to The Allison Company, Bridgeport, Conn., a corporation of Connecticut Application July 12, 1952, Serial No. 298,522

8 Claims. (Cl. 51—206)

The present invention relates to new and useful improvements in circular cutting tools and has particular relation to abrasive cutting or cutoff wheels of the type employed for cutting alloy steel and other tough metals. Such cutoff wheels are, from their nature as a cutoff tool, of an extreme degree of thinness, for example, up to ⅜", and are of relatively large diameter, for example, ranging from 20" and over. While this has been the practical range heretofore, it is here pointed out that, according to the present invention, the production of relatively greater diameter wheels, for example, 48" and larger, becomes possible and practicable. The diameter of the cutting wheel is determined by the diameter of the stock to be cut, and, as this increases, as in large tubing, rolls, castings, etc., the very thin wheel has to be increased in diameter. Heretofore, this has resulted in extreme extension or overhang of the thin body of abrasive material between the hub or supporting flanges and the outer periphery, so that this mass constituted, in effect, an unsupported structure which could be compared to a thin structural beam subject to major deflections under load.

It has been found that in heavy cutting the relatively long lines of high stresses in tension and compression tend to cause wheel deflections, buckling, etc., which are detrimental to ideal cutting performance. Furthermore, when starting a heavy cut, and again when breaking through at the finish of a cut, the pressure forces tend to decelerate and accelerate wheel speed in a manner to still further create high stresses in the abrasive body of the wheel.

The practical depth of cut, and therefore the resulting maximum size of stock, are limited to the amount of extension from the driving hub or wheel flanges that the abrasive cutoff wheel can stand and still retain its effective cutting operation.

It is an object of the present invention to provide in an abrasive cutoff wheel, a low stress structure that will enable the full effectiveness of the abrasive cutoff to be realized without being limited by size restrictions.

To this end, it is proposed in the present invention to provide a cutoff wheel in which the abrasive body is in the form of a circular rim, either continuous or segmental, having the desired large outer peripheral diameter and an inner peripheral diameter also relatively large, so that the radial distance between the inner and outer peripheries is relatively small, and further to mount such abrasive rim upon a wheel center of the same or less thickness, such center mounting being preferably of metal and constituting a low stress large diameter flywheel structure of which the abrasive rim constitutes a low stress relatively short extension.

It is a further object of the invention to create such effective relative proportions of small rim extension and large metal center as to assure a sufficiently large abrasive wheel body for a practical period of operation without machine downtime for wheel change, and to assure effective performance at a nearly uniform S. F. M. (surface feet per minute) of the wheel, whether new or in worn down size.

It is further proposed to create such relative proportion of small rim extension and large metal center that the metal center may come relatively close to the cutting edge of the abrasive wheel, so that the rotating metallic mass has a flywheel effect to provide the power to assure uniform stability for the thin abrasive cutting rim and a practical control of cutting speed free from either rapid acceleration or deceleration so detrimental to good cutting performance.

It is further proposed to provide a metal wheel center in which vibration will be damped to a high degree, and which has relatively great structural stability and rigidity so that pressure and rotating forces upon the wheel will not cause it to distort or otherwise become disaligned from a true plane of rotation normal to the rotating axis.

To this end, it is proposed to provide a metal wheel center made up of metal sheets of a ply or laminated structure so that the greatest practical vibration dampening value will be obtained. It is further proposed to provide within the metal wheel center an inherent structural brace to give a maximum degree of rigidity. In particular, it is proposed to provide the metal wheel center in the form of a pair of normally flat apertured discs rigidly spaced at at least one of their peripheries and pre-stressed between their peripheries by fastening means drawing the discs toward each other, whereby a coned cross-sectional shape is produced which, in effect, includes a "tripod" truss structure having as its base the rigidly spaced periphery of the wheel center.

A further object of the invention is to provide a metal wheel center, permanent in its nature, and which will enable the quick and convenient remounting of new abrasive cutting rims.

A further object is to provide an improved rim fastening means which will function effectually within the extremely narrow wheel width, and will, at the same time, provide uniformly distributed wheel holding and aligning means, and an effective means of distributing driving torque to the wheel rim through the metal wheel center.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 5 is a sectional view of the abrasive wheel taken along the line 5—5 of Fig. 1, also on an enlarged scale;

Fig. 6 is a detail sectional view on a further enlarged scale, showing one of the fastening bolts employed, the same being taken along the line 6—6 of Fig. 5;

Fig. 7 is a sectional view, similar to Fig. 4, of a modified form of the wheel center disc in which the laminations are secured by spot welding;

Fig. 8 is a similar view of a further modification of the wheel center disc, in which the laminations are pressure bonded together by a plastic bond;

Fig. 9 is a sectional view of a modified abrasive rim;

Fig. 10 is a sectional view of another modified abrasive rim;

Fig. 11 is a graph illustrating test results of stresses to show the major differences between the standard cutoff wheel and the metal center rim wheel of the present invention;

Fig. 12 is a schematic view showing the lines of stress in compression and tension of a cutoff wheel according to the invention; and Fig. 13 is a similar schematic view showing the stress lines of compression and tension of a standard cutoff wheel.

Fig. 14 is a front elevational view, on a reduced scale, showing a cutoff wheel according to a modification of the invention.

Figure 1:
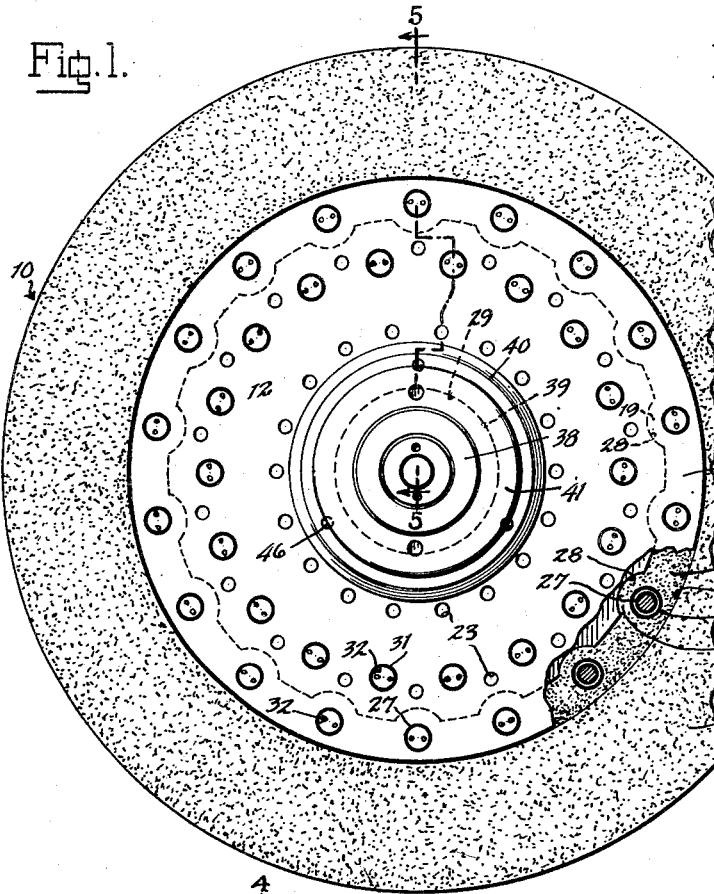
Fig. 1 is a front elevational view, partially broken away, showing a cutoff wheel according to the invention.
Figure 2:
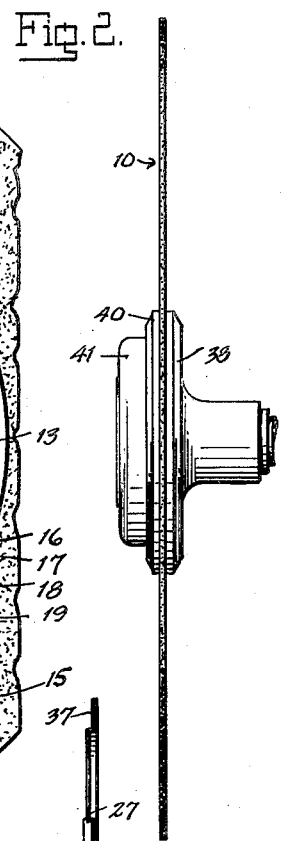
Fig. 2 is a side elevation.
Figure 3:
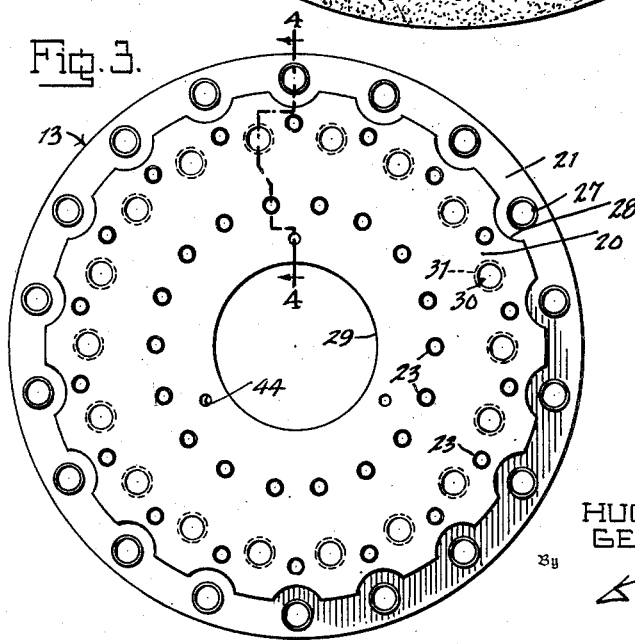
Fig. 3 is a plan view of the inner side of one of the metal wheel center discs employed.
Figure 4:
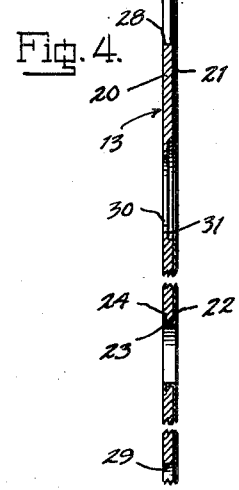
Fig. 4 is a sectional view of the wheel center disc taken along the line 4—4 of Fig. 3, the same being on an enlarged scale and partially broken away.

Referring in detail to the drawings, and more particularly to Figs. 1–10, the improved abrasive cutoff wheel, according to the illustrated exemplary embodiment of the invention, comprises generally an abrasive wheel rim 10 which may be in the form of a continuous annulus or formed of a series of segments, as indicated by the radial divisions 11 in Fig. 14.

This wheel rim is carried upon a metal wheel center, generally indicated at 12, and formed of two similar or complementary bolted-together circular disc members 13—13, hereinafter more fully referred to. The abrasive wheel rim 10 may be molded in one piece or otherwise suitably formed of the usual abrasive materials, such as abrasive grain and a suitable bond, such as resin, rubber, or the like. The composition may, if desired, have suitable reinforcement, such as glass or asbestos fibers, foil and the like, incorporated therein. Preferably, the wheel rim is of laminated form consisting of an inner body 14 and outer side surface layers 15—15 bonded to the body and having their inner peripheries outwardly offset from the inner periphery of the body so that the inner marginal portion 16 of the rim projects inwardly from the inner circular edges of the layers 15—15 with its side surfaces inwardly offset to provide annular recesses 17—17 for receiving the clamping edges of the center wheel discs, as will presently more fully appear. As distinguished from a grinding wheel having a relatively wide grinding face, the cutting face of the cut-off wheel is of extremely small width, up to ⅜", in comparison to diameter, 20" to 48", and the side surfaces are parallel to each other so that the cutting face remains of equal width as its diameter decreases through wear.

Within the inner marginal portion 16, there is provided a series of holes 18 for receiving the clamping bolts, and, in concentric relation to these holes, there are provided cog projections 19 for interlocking engagement with the wheel center, as will presently more fully appear.

The companion or complementary discs forming the wheel center are of laminated structure, preferably bi-metallic, and consisting of an inner thick metal sheet 20 and a thinner outer metal sheet 21. The laminated structure may, of course, be made up of equal thicknesses of a counterbore 24 at the inner side of the piece 20, the desired.

The particular metal employed for the laminations may be selected for best performance, for instance, the inner piece may be of a tough, hardened and heat treated stock of a saw steel alloy and the thin outer piece may be of a tough, heat treated stainless steel alloy of suitable temper. The laminations may be bonded together by known methods suitable for the purpose.

In Figs. 1–6, the laminations are shown as secured by providing at suitable points, along concentric lines and in staggered relation to each other, a series of circular holes 22 in the piece 20 into which a punch drawn portion of the piece 21 is engaged and secured by mechanical lock seams 23 formed by joint rolling of the relatively thin piece 21 about the edge of the hole 22 and flared over tightly into a counterbore 24 at the inner side of the piece 20, the hole being then sized to set the fastening.

As shown in Fig. 7, the two pieces 20 and 21 are secured by spot welding at suitable points, as at 25. The spot welds are made with both ply pieces rigidly held under pressure, with an irregular symmetrical series of locations throughout the surface. This produces a relatively rigid type of bond with a maximum degree of vibration dampening value, as well as control of surfaces against distortion.

As shown in Fig. 8, the two pieces 20 and 21 are bonded by a plastic bonding layer 26 between the sheets suitably adhered by heat and pressure. In this bonding method, the two ply pieces are coated with a plastic metal bonding cement.

The pieces 20 and 21 of the bimetallic disc are of circular outline, the piece 20 being of smaller diameter so that the thin piece 21 has a marginal projection adapted to overlie the inner peripheral margin of the wheel rim, and which is provided with a series of circular depressed apertured pockets 27 which fit within the holes 18 of the wheel rim. The outer periphery of the piece 20 is provided, in concentric relation with the pockets 27, with driving cog grooves 28 into which the cog projections of the wheel rim engage to thus center and interlock the disc with the wheel rim.

A central hub engaging opening 29 is provided in the disc and between the edge of this opening and the outer periphery, there is provided a series of circular holes 30 provided with counterbores 31 at their outer sides. The points 23 at which the two pieces 20 and 21 are secured together are arranged so that the inner and outer circumferentially spaced securing points are respectively in radial lines with the inner and outer circumferentially spaced holes 30 and 27 thereby evenly distributing the securing points.

The two laminated companion discs are engaged at each side of the wheel rim to center and hold it between them and thereupon the discs are secured together by fastening bolts 32 engaged in the pockets 27 at the outer clamping marginal portions of the discs, and engaged through the holes 30 between the inner periphery of the wheel rim and the mounting hub. These fastening bolts are of a distinctive design to provide greatest locking power, each comprising a bolt member having a relatively wide head 33 provided with a low pitch threaded shank 34 and an internally threaded pocket or nut member 35 having a wide head 36. The relatively large diameter heads 33 and 36 seat within the recessed pockets and provide the greatest degree of stiffness and pressure over the largest possible area. The recessed portions are formed by dies to completely seat both the bolt and nut flush with the disc face and assure proper clearance to the outer surface of the disc. In the case of the stainless steel, the forming of the recess materially "cold works" the stainless steel, or equivalent hard tempered metal, to assure the maximum stiffness of the disc near the bolt for best wheel gripping power.

Sometimes, in mounting abrasive wheels, blotters are used between the wheel and its mounting hub to provide a surface for the uneven wheel surface particles to sink into for even area pressure. In the present structure, a method may be employed consisting in coating each of the inner wheel rim locking surfaces of the companion center wheel discs with a semi-resilient plastic film 37 along its area which contacts the side of the abrasive wheel rim to assure this same uniform pressure result, or, conversely, the wheel rim itself may be coated at each side of its inner marginal portion 16. The sharp abrasive grit covering the wheel surface presents many points of small area which, when clamped, present a high stress condition should the balance of the uneven wheel surface not be equally firmly gripped. The film 37 insures equal firm gripping.

The companion discs are mounted upon a spindle-carried flanged driving hub 38 within an annular recess 39, being secured to the hub by a suitable flange ring 40 and clamping ring 41. The flange of the hub and the flange ring receive between them a substantial inner marginal portion of the companion wheel center discs surrounding their central openings 29.

Between the two wheel center discs, along their areas gripped between the hub flanges, there is provided a spacer ring or shim washer 42. Driving pins 43 secured in the flanged driving hub 38 are engaged through holes 44 in the wheel center discs, holes 45 in the spacer ring 42, and holes 46 in the flange ring 40, and serve to prevent any relative slip between the wheel and the driving hub. The shim washer is of such thickness that it rigidly spaces the inner peripheral marginal portions of the wheel center discs a distance slightly greater than the thickness of the inner peripheral marginal portion 16 of the wheel rim. The outer annular row of fastening bolts is thereupon tightened to draw the outer peripheral marginal rim clamping portions of the discs tightly against the portion 16 of the rim, and thereby stressing the discs out of their normal flat condition. Thereupon the inner annular row of fastening bolts is tightened, and preferably to such a degree as to cause the companion discs to be further drawn toward each other between their rigidly spaced inner and outer peripheries. Thus, both companion discs are forced into a pre-stressed position to assure their holding a rigid uniform shape during the wheel cutting operation free from any tendency to buckle or distort. This stressing results in coning the discs from their normal flat condition so that, in cross section, there are presented rigid tripod trusses of which the inner and outer rigidly spaced peripheral marginal portions are the bases and the portions adjacent the tightening bolts are the apices.

The outer annular row of fastening bolts directly clamps through the abrasive wheel rim, providing a positive lock against flying out at high speed, and assuring the maximum distribution of pressure over the wheel rim. The inner row of bolts further supports this area pressure distribution and provides the rigid clamp at the outer portion of the tripod truss structure of the stress fastened companion wheel center discs.

In Fig. 9 there is shown a modified abrasive rim 10a in which the inner marginal portion 16a is in the form of a metal, plastic or other suitable material embedded in and interlocked with the abrasive body 14a by means of perforations 47 in the embedded portion into which the abrasive material of the body is molded.

In Fig. 10 there is shown another modified abrasive rim 10b in which reinforcing layers 48—48 of woven wire, asbestos, glass fiber, or other suitable material, are molded into the rim between the body 14 and the outer side surface layers 15—15 and at each side of the inner marginal portion 16.

In a comparison of free-running stresses between a relatively small diameter standard abrasive wheel and the larger diameter rim wheels of the present invention, there is a strikingly large reduction in stress for the rim wheels. Fig. 11 graphically illustrates clearly the major differences between the present standard wheel and the metal center rim wheel of the invention. In the comparison tests illustrated, the 20"/5" standard wheel refers to a 20" diameter wheel having a 1" center bore and 5" mounting flanges. The 36"/24" wheel of the invention refers to a 36" outside diameter of the wheel rim and a 24" inside diameter in which is fitted the metal wheel center. The 48"/40" wheel of the invention refers to an abrasive wheel rim of 48" outside diameter and 40" inside diameter.

The lower left hand graph illustrates the 20"/5" standard wheel with tangential stress (ST) at the left and radial stresses (SR) at the right. In the middle graph, illustrating the 36"/24" rim wheel of the invention, it will be noted that the stresses for the same 9000 S. F. M. (surface feet per minute) cutting speed have been reduced from 450 p. s. i. (pounds per square inch) to 240 p. s. i. The upper right hand graph, illustrating the 48"/40" rim wheel of the invention, shows a further great reduction in the stresses to less than one-third that of the standard wheel. It is further pointed out that the dotted stress lines of the upper right hand graph illustrate that it is possible and practical to increase cutting speed from 9000 S. F. M. to 17,000 S. F. M. before stress values equal that of the standard wheel at 9000 S. F. M. The advantages in the possibilities of increased rates of abrasive cutoff are apparent with rigidly supported, stabilized, uniform cutting speeds.

Figs. 12 and 13 illustrate the great difference and distinctiveness of the present rim wheel over the standard wheel with respect to stresses. Fig. 13 graphically illustrates the lines of stress in tension and compression of the 20"/5" standard wheel. The long unsupported abrasive disc of plastic material is subjected in cutting to stresses resembling those of an overloaded long slender structural beam that is liable to cause buckling and binding. Fig. 12 graphically illustrates the lines of stress in tension and compression on a 48"/40" rim wheel of the present invention. The radical change in relationship of the stress lines is startling, as they are now very short due to the rigid support of the large metal wheel center with mass weight close to the cutting edge of the wheel to assure a much finer and more firm cutting of the wheel.

The principal features of improvement of the metal wheel center abrasive rim wheel of the invention may be summarized as follows:

1. Makes large diameter cutoff wheels practical.
2. Provides rigid support close to the cutting edge.
3. Provides stabilized speed through weight close to cutting edge.
4. Makes greatly increased cutting speeds possible.
5. Makes very deep cuts in large stock practical.
6. Assures quick and easy wheel replacement.
7. Assures of low stress construction.
8. Provides a vibration dampened construction.
9. Provides laminated wheel discs of major vibration dampening value.
10. Provides a complete metal center rim wheel mounting less than wheel width.
11. Provides wheel locking and clamping means less than wheel width.
12. Provides driving cogs for distribution of driving torque close to cutting edge.
13. Proportions most of abrasive close to rim for nearly constant cutting R. P. M. from new to worn out rim wheel.
14. Provides sufficient abrasive in rim wheel to assure full production day without downtime to change wheels.
15. Provides both a single rim wheel and a multiple segment rim wheel construction.

Having thus set forth the nature of our invention, what we claim is:

1. In an abrasive cutting wheel, a thin abrasive wheel rim having an outer peripheral cutting face and side faces, a wheel center comprising a pair of disc members located substantially within parallel planes passing along said side faces of said wheel rim, spacer means disposed between said disc members contiguous to their outer periphery, spacer means disposed between said disc members in radially inwardly spaced relation to said first spacer means, and fastener means disposed radially outwardly of said first spacer means clampingly engaged with said disc members and drawing them toward each other whereby the areas of said clamping members between said first and second spacer means are stressed out of their normal planes.

2. In an abrasive cutting wheel, a thin abrasive wheel rim having an outer peripheral cutting face and side faces, a wheel center comprising a pair of disc members located substantially within parallel planes passing along said side faces of said wheel rim, spacer means disposed between said disc members contiguous to their outer periphery, spacer means disposed between said disc members in radially inwardly spaced relation to said first spacer means and having a greater spacing dimension than said first spacer means, and fastener means disposed radially outwardly of said first spacer means clampingly engaged with said disc members and drawing them toward each other whereby the areas of said clamping members between said first and second means are stressed out of their normal planes.

3. In an abrasive cutting wheel, a thin abrasive wheel rim having an outer peripheral cutting face, side faces, and a reduced thickness inner peripheral marginal portion having inwardly offset side surfaces, a wheel center comprising a pair of disc members located substantially within parallel planes passing along said side faces of said wheel rim, the outer peripheral marginal portions of said disc members overlying said inwardly offset side surfaces of said wheel rim, spacer means disposed between said disc members in radially inwardly spaced relation to the inner periphery of said wheel rim, said inner marginal portion of said wheel rim being of a thickness whereby said center wheel disc members are spaced apart thereby and having a spacing dimension less than the spacing dimension of said spacer means, and fastener means disposed radially outwardly of said spacer means clampingly engaged with said disc members and drawing them toward each other whereby the areas of said clamping members between said wheel rim and said spacer means are stressed out of their normal planes.

4. In an abrasive cutting wheel, a thin abrasive wheel rim having an outer peripheral cutting face, side faces, and a reduced thickness inner peripheral marginal portion having inwardly offset side surfaces, a wheel center comprising a pair of disc members located substantially within parallel planes passing along side faces of said wheel rim, the outer peripheral marginal portions of said disc members overlying said inwardly offset side surfaces of said wheel rim, spacer means disposed between said disc members in radially inwardly spaced relation to the inner periphery of said wheel rim, said inner marginal portion of said wheel rim being of a thickness whereby said center wheel disc members are spaced apart thereby, and fastener means disposed intermediate said wheel rim and said spacer means clampingly engaged with said disc members and drawing them toward each other whereby the areas of said clamping members between said wheel rim and said spacer means are stressed out of their normal planes.

5. In an abrasive cutting wheel, a thin abrasive wheel rim having an outer peripheral cutting face, side faces, and a reduced thickness inner peripheral marginal portion having inwardly offset side surfaces, said marginal portion having a series of circumferentially spaced fastener receiving holes, a wheel center comprising a pair of disc members located substantially within parallel planes passing through said side faces of said wheel rim, the outer peripheral marginal portions of said disc members overlying said inwardly offset side surfaces of said wheel rim and each having an outer series of circumferentially spaced fastener receiving holes in register with said holes of said wheel rim, a series of fastener means engaged through said registering holes, spacer means disposed between said disc members in inwardly spaced relation to the inner periphery of said wheel rim, said inner marginal portion of said wheel rim being of a thickness whereby said center wheel disc members are spaced apart thereby, said disc members each having an inner series of circumferentially spaced fastener receiving holes disposed in concentric relation to said outer series of holes and intermediate said wheel rim and said spacer means, said inner holes of the respective flange members registering one with the other, and a series of fastener means clampingly engaged with said disc members through said inner series of holes and drawing them toward each other whereby the areas of said clamping members between said wheel rim and said spacer member are stressed out of their normal planes.

6. The invention as defined in claim 5, further characterized in that said inner series of holes are in radial lines intermediate the radial lines of said outer series of holes.

7. In an abrasive cutting wheel, a thin abrasive wheel rim having an outer peripheral cutting face, side faces, and a reduced thickness inner peripheral marginal portion having inwardly offset side surfaces, said marginal portion having a series of circumferentially spaced fastener receiving holes and having at its inner periphery a series of circumferentially spaced cog formations, a wheel center comprising a pair of laminated disc members located substantially within parallel planes passing through said side faces of said wheel rim, each disc member including an inner lamination having in its outer periphery a series of cog formations interlockingly engaged with said cog formatons of said wheel rim, and an outer lamination having an outer peripheral marginal portion overlying said inwardly offset side surfaces of said wheel rim and having a series of circumferentially spaced fastener receiving holes in register with said holes of said wheel rim, a series of fastener means engaged through said registering holes, spacer means disposed between said members in inwardly spaced relation to the inner periphery of said wheel rim, said inner marginal portion of said wheel rim being of a thickness whereby said center wheel flange members are spaced apart thereby, and a series of circumferentially spaced fastener means disposed intermediate said wheel rim and said spacer means clampingly engaged with said disc members and drawing them toward each other whereby the areas of said clamping members between said wheel rim and said spacer means are stressed out of their normal planes.

8. In an abrasive cutoff wheel, an abrasive wheel rim having an outer peripheral cutting face, and an inner peripheral marginal portion having a reduced thickness having inwardly offset side surfaces, a wheel center comprising a pair of normally flat flexible disc members, each comprising an inner part having an outer periphery nesting within the inner peripheral marginal portion of said wheel rim, and an outer part having an outer peripheral marginal portion overlying the inner marginal portion of said wheel rim, said inner parts being spaced apart between their inner and outer peripheries in their normal flat condition, and fastening means drawing said disc members toward each other between their inner and outer peripheries to pre-stress them into an inwardly bowed relation one to the other.

References Cited in the file of this patent

UNITED STATES PATENTS

| Number | Name | Date |
|---|---|---|
| 1,589,440 | Steiner | June 22, 1926 |
| 1,600,064 | Perks | Sept. 14, 1926 |
| 1,783,727 | Larsson | Dec. 2, 1930 |
| 1,783,728 | Larsson | Dec. 2, 1930 |
| 1,783,729 | Larsson | Dec. 2, 1930 |
| 2,044,442 | Offenbacher | June 16, 1936 |

FOREIGN PATENTS

| Number | Country | Date |
|---|---|---|
| 980,209 | France | May 9, 1951 |